May 31, 1949.  A. H. BATES  2,471,402
PISTON RING GAP-ALIGNING DEVICE
Filed April 30, 1945  2 Sheets-Sheet 1
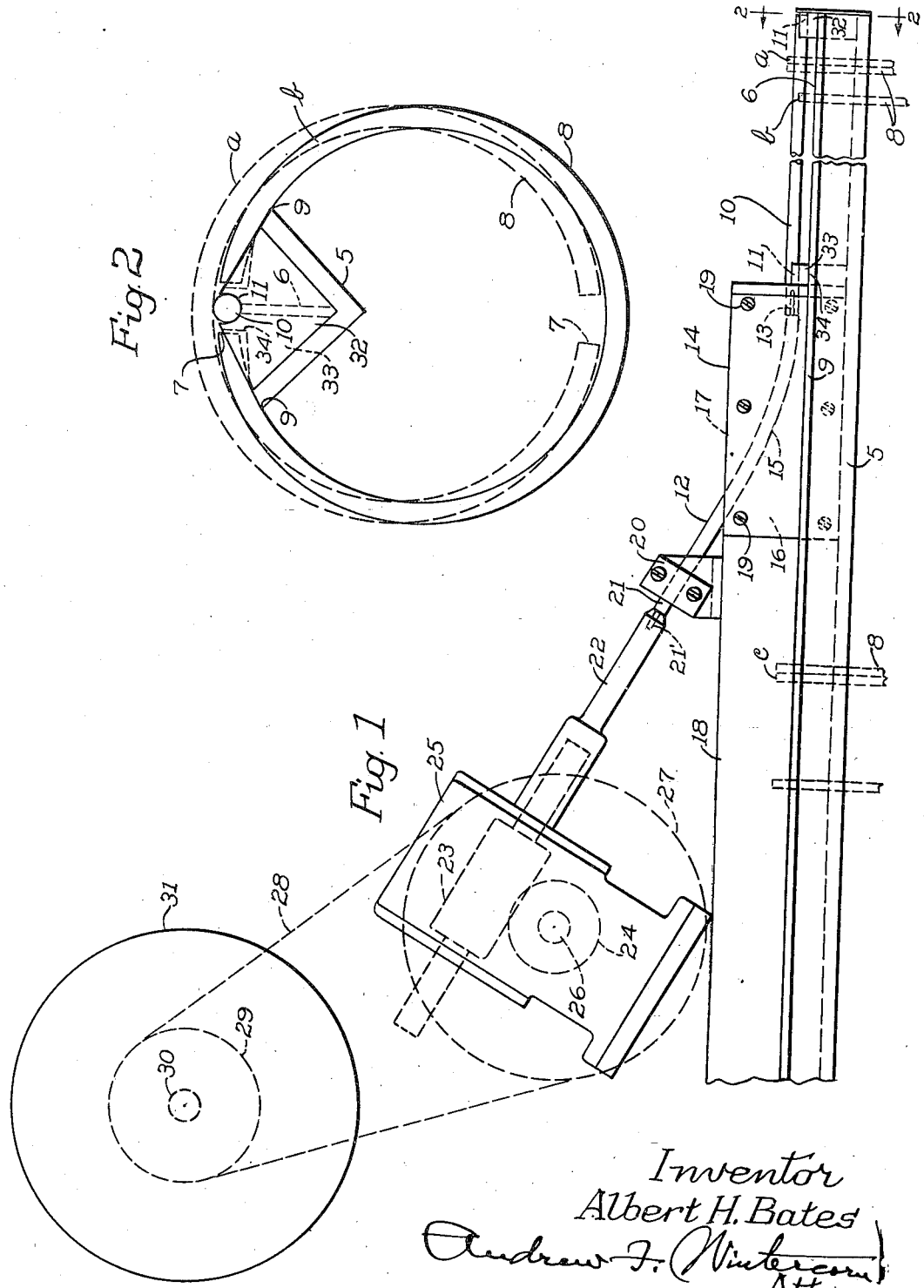
Inventor
Albert H. Bates
Andrew F. Wintercorn
Atty.

May 31, 1949.                     A. H. BATES                       2,471,402
                          PISTON RING GAP-ALIGNING DEVICE
Filed April 30, 1945
                                                              2 Sheets-Sheet 2
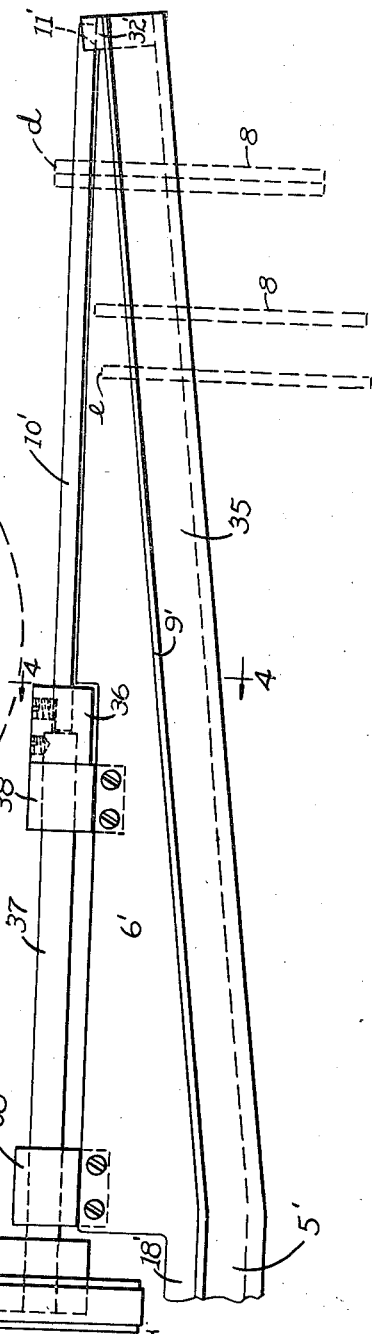
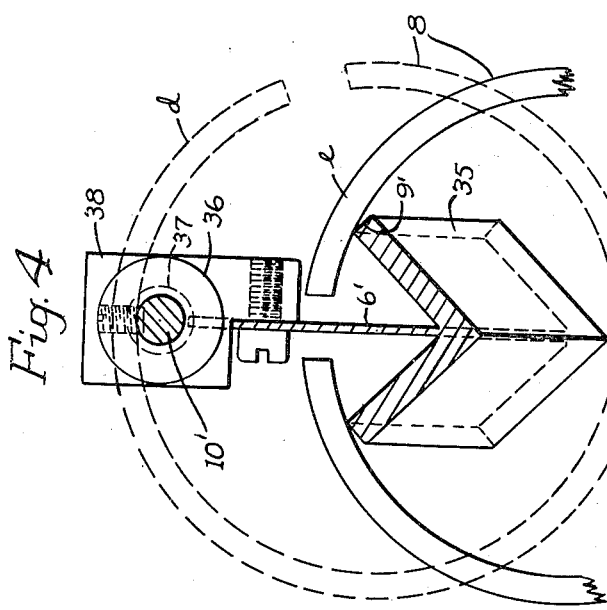
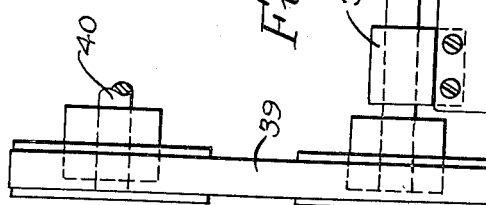
Inventor
Albert H. Bates
Andrew F. Wintercorn
Atty Patented May 31, 1949

2,471,402

UNITED STATES PATENT OFFICE 2,471,402

PISTON RING GAP-ALIGNING DEVICE

Albert H. Bates, Rockford, Ill.

Application April 30, 1945, Serial No. 591,141

13 Claims. (Cl. 193—43)

This invention relates to a piston ring gap-aligning device, especially designed and adapted for use in the quantity production of piston rings, to permit aligning the gaps and moving the rings along a transfer member on which they are guided by their gaps, without necessitating removal of the rings from the aligning device before transfer of the rings to another operation.

In a copending application Serial No. 573,690, I disclosed transfer racks of novel form upon which the split rings are slidably supported by their gap portions for transfer from one point to another most conveniently, to facilitate handling of the rings through a series of operations and in the subsequent inspection. It is the principal object of my present invention to provide the rotating aligning shaft in such relationship to the vertical guide rib of the transfer rack that as soon as the rings have their gaps aligned they drop off onto the transfer rack and can be moved along the same to the next operation without any intermediate handling, thus reducing the labor cost and also speeding up production.

The invention is illustrated in the accompanying drawings, in which—

Fig. 1 is a side view of an aligning device made in accordance with my invention;

Fig. 2 is an end view on the line 2—2 of Fig. 1 showing the rack on a larger scale, indicating in dotted lines the disposition of rings on the aligning shaft before they have their gaps aligned, and indicating in full lines the disposition of the rings on the transfer rack after alignment of their gaps;

Fig. 3 is a side view of a modified or alternative form of aligning device, and

Fig. 4 is a cross-section on the line 4—4 of Fig. 3 on an enlarged scale, showing again by dotted line and full line positions, as in Fig. 2, how the rings when aligned are automatically deposited on the transfer rack.

Similar reference numerals are applied to corresponding parts in these four views.

In the copending application mentioned above, I described how the piston rings, after an initial split and trim operation, are placed on an arbor for rough and finish turning operations. In these turning operations, it is sometimes preferred not to have the gaps aligned, because with the gaps in adjacent rings in staggered relation smoother turning operations can be performed. After these turning operations, the rings may, when removed from the arbor, be placed on an aligning device, like that shown in Figs. 1 and 2, for alignment of the gaps, so that the rings may be slid along the transfer rack to the next operation without the necessity for any intermediate handling of the rings.

Referring to Figs. 1 and 2, a V-shaped rack 5 is illustrated, having a vertical middle rib 6, which is arranged to enter the gaps 7 in the rings 8, to guide the rings in their sliding movement along the rack, during which the rings have their gap end portions freely slidable along the upper edges 9 of the V, as clearly illustrated in Fig. 2. The rack 5 may, however, be of any other suitable form, three other forms being disclosed, for example, in my copending application mentioned above. The important thing is that the distance from either side of the rib 6 to the outer edge of the opposite side of the rack is greater than the width of the gap in the rings, so that they cannot drop off the rack. Heretofore, rings were placed on a rotating horizontal shaft, which turned the rings until the gaps came into alignment with the shaft, thereby aligning the gaps, after which the rings were removed from the aligning shaft to a transfer rack, similar to that shown at 5. In accordance with the present invention, a rotating shaft 10 is made part of a unitary assembly with the rack 5 and disposed in longitudinal alignment with and directly above one end portion of the vertical rib 6, in which position it is supported in channel-shaped bearings 11 at its opposite ends, and a flexible shaft 12 is detachably connected to one end thereof, as indicated at 13. The shaft 12 extends upwardly from the inner end of the shaft 10 at an acute angle and is, furthermore, small enough in diameter so that even allowing for the added thickness of opposed thin retaining plates 14, between which an elongated passage 15 is provided, between the end portions 16 and 17 of the widened main portion 18 of the rib 6, there will be no interference with the free sliding movement of the rings along the rack 5 from the outer end portion thereof, where the gap alignment occurs, to the other portion thereof that extends inwardly from the aligning means. It will be understood that the widened main portion 18 of the rib 6 is slotted to provide the elongated opening 15 for the flexible shaft 12 between the spaced, generally triangular-shaped portions 16 and 17, and that the plates 14, which are indicated as fastened to the portions 16 and 17 by screws 19, will maintain the cut-off portion 17 in the proper relation to the portion 16. A suitable bearing 20 is provided for the free end portion 21 of the flexible drive shaft 12, and this free end portion is suitably connected, as indicated at 21', to a spindle 22. The latter is adapted to be driven in any suitable manner, as, for example, by a worm 23 meshing with a worm gear 24 in a housing 25 that is suitably supported in fixed relation to the rack 5, the worm gear 24 having the shaft 26 thereof driven by a pulley 27 through a belt connection 28 with the pulley 29 on the armature shaft 30 of an electric motor 31 suitably supported in fixed spaced relation to the housing 25. The drive means for the shaft 10, in other words, can by virtue of the flexible shaft connection 12 be disposed in an out-of-the-way position relative to the rings that are arranged to move along the transfer rack after alignment of their gaps. This arrangement is intended for locations where the transfer rack is substantially horizontal, or where it has very little slope.

In operation, the rings are placed over the right hand end of the rack 5, resting on the shaft 10, and then, as soon as the individual rings have been turned by contact with the shaft enough to bring their gaps into alignment with the shaft, these rings drop down from the position indicated at a to the position indicated at b, and in the latter position are slidably supported on the upper edges 9 of the rack and at first are guided by the shaft 10 in their sliding movement until such time as the operator slides the rings inwardly along the rack past the plates 14, between which the flexible shaft 12 extends, until ultimately the rings reach the position c where the main portion 18 of the vertical rib 6 guides the rings by their gap portions during the rest of their travel along the rack. The vertical rib 18, as described in the copending application, facilitates the picking up of a large number of rings at one time with a novel form of elongated transfer pliers or tongs, when, for example, the rings are to be transferred to another machine for the next operation. In passing, it will be noted that the V-blocks 32 and 33, in which the bearings 11 are provided, do not interfere with the placing of the rings over the shaft 10, but the block 33 is preferably notched out on both sides of the shaft 10, as indicated in dotted lines at 34 in Fig. 2, to avoid interfering with the sliding of the rings past this block inwardly along the rack after the gaps therein have been aligned.

A similar aligning device is shown in Figs. 3 and 4 in combination with an upwardly inclined outer end portion 35 of a V-shaped rack 5′. In this case the rotating aligning shaft 10′ is coupled, as shown at 36, to a drive shaft 37 mounted in suitable bearings 38 carried on the upper edge portion of the vertical guide rib 6′. The shaft 10′ is supported at its outer end in a channel-shaped bearing 11′ provided in a V-block 32′ mounted in the outer end portion of the inclined section 35 of the rack 5′. The coupling 36 supports the other end of the shaft 10′ in co-axial relationship to the drive shaft 37. The inclination of the end portion 35 of the rack is enough to make room for the driving mechanism 36—38 above the upper edges 9′ of the rack portion 35, so that the rings 8, which before alignment are in the position d resting on the shaft 10′, will when their gaps are aligned drop down onto the upper edge portions 9′ of the rack, as shown at e, and will slide freely, more or less by gravity, downwardly onto the main horizontal portion of the rack 5′, without any interference or obstruction whatsoever by the driving mechanism 36—38.

The operation of this aligning device is believed to be clear from the foregoing description, and it will be understood that the shaft 37 may be driven in any suitable manner, similarly as the spindle 22 in Fig. 1. Therefore, it was not considered necessary to illustrate any thing beyond the belt and pulley drive connection 39 with a shaft 40, which may correspond to the driven spindle 22 extending from the speed reducer unit 25, the speed reduced unit in this case being likewise driven by a suitable electric motor, corresponding to the motor 31 in Fig. 1.

It is believed the foregoing description conveys a good understanding of all of the objects and advantages of my invention. The appended claims have been drawn with a view to covering all legitimate modifications and adaptations.

I claim:

1. An aligning device for use in aligning gaps in the inner circumference of rings which have their gap portions inherently in a substantially fixed spaced relation comprising, in combination, an elongated slide bar for slidable suspension support of a plurality of rings by their gap portions while disposed face to face, said slide bar having a vertical portion of small thickness in relation to the gaps in the rings projecting upwardly between the gap portions to guide the rings in their sliding movement and maintain the gaps aligned, and a rotary aligning shaft of small diameter in relation to the gaps in the rings supported above and close to the top of said vertical portion and having its axis substantially in the same vertical plane therewith.

2. A device as set forth in claim 1 wherein the slide bar has lower portions projecting transversely from opposite sides of the vertical portion, the rings being suspended by their gap portions slidably supported on top of said lower portion, the distance from either side of said vertical portion to the opposite side of the lower portion being greater than the width of the gap in the rings.

3. A device as set forth in claim 1 wherein the slide bar is V-shaped, the rings being suspended by their gap portions slidably supported on the arms of the V, and the vertical guide portion projecting upwardly from the middle portion of the V.

4. A ring gap aligning device for use in the manufacture of split piston rings and the like comprising, in combination, an elongated slide bar for slidable suspension support of a plurality of rings by their gap portions while disposed face to face, said slide bar having a vertical portion projecting upwardly between the gap portions to guide the rings in their sliding movement and maintain the gaps aligned, a rotary aligning shaft supported above and close to the top of said vertical portion and in the same vertical plane therewith, and power operable means for turning said shaft including a flexible shaft extending upwardly at an acute angle from one end of said aligning shaft, said flexible shaft being of a diameter small enough to pass readily through the gaps in the rings, whereby the aligned rings will not be obstructed by said flexible shaft in their sliding movement along said slide bar.

5. An aligning device for use in aligning gaps in split rings which have their gap portions inherently in a substantially fixed spaced relation comprising, in combination, an elongated slide bar for slidable suspension support of a plurality of rings by their gap portions while disposed face to face, said slide bar having a vertical portion of small thickness in relation to the gaps in the rings projecting upwardly between the gap portions to guide the rings in their sliding movement and maintain the gaps aligned, and a rotary aligning shaft of small diameter in relation to the gaps in the rings supported above and close to the top of said vertical portion and having its axis substantially in the same vertical plane therewith, said aligning shaft being in acute angle relationship to that portion of said slide bar whereon said rings are slidable when aligned, said aligning shaft being substantially horizontal and the slide bar being inclined downwardly therefrom.

6. A ring gap aligning device for use in the manufacture of split piston rings and the like comprising, in combination, an elongated slide bar for slidable suspension support of a plurality of rings by their gap portions while disposed face to face, said slide bar having a vertical portion projecting upwardly between the gap portions to guide the rings in their sliding movement and maintain the gaps aligned, a rotary aligning shaft supported above and close to the top of said vertical portion and in the same vertical plane therewith, said aligning shaft being in acute angle relationship to that portion of said slide bar whereon said rings are slidable when aligned, said aligning shaft being substantially horizontal and the slide bar being inclined downwardly therefrom, and power operable means for driving said aligning shaft coupled to the inner end thereof which is spaced farthest relative to the said slide bar portion, said means being enlarged relative to said shaft but spaced sufficiently from said slide bar portion so that the aligned rings are readily slidable therebeneath.

7. For use in aligning gaps in split rings which have their gap portions inherently in a substantially fixed spaced relation, a supporting rack for slidably supporting a stack of rings in face to face relation, said rack having a vertical guide portion of small thickness in relation to the gaps in the rings projecting into the gap portions to guide the rings in their sliding movement and maintain the gaps aligned, and gap aligning means above said guide portion passable freely through the gaps in the rings, whereby the aligned rings are deposited by gravity onto the rack.

8. For use in aligning gaps in split rings which have their gap portions inherently in a substantially fixed spaced relation, a supporting rack for slidably supporting a stack of rings in face to face relation, said rack having a vertical guide portion of small thickness in relation to the gaps in the rings projecting into the gap portions to guide the rings in their sliding movement and maintain the gaps aligned, and gap aligning means above said guide portion passable freely through the gaps in the rings, whereby the aligned rings are deposited by gravity onto the rack, the rack having an inclined end portion under the aligning means whereby the rings when deposited thereon gravitate toward the lower portion of said rack.

9. A device as set forth in claim 1 wherein the slide bar is V-shaped, the rings being suspended by their gap portions slidably supported on the upper edges of the arms of the V, and the vertical guide portion projecting upwardly between the arms of the V, the distance from either side of the vertical portion to the upper edge of the arm on the opposite side of the V being greater than the width of the gap in the rings.

10. A ring gap aligning device for use in the manufacture of split piston rings and the like comprising, in combination, an elongated slide bar for slidable suspension support of a plurality of rings by their gap portions while disposed face to face, said slide bar having a vertical portion projecting upwardly between the gap portions to guide the rings in their sliding movement and maintain the gaps aligned, a rotary aligning shaft supported above and close to the top of said vertical portion and in the same vertical plane therewith, said aligning shaft being in acute angle relationship to that portion of said slide bar whereon said rings are slidable when aligned, and power operable means for driving said aligning shaft coupled to the end thereof which is spaced farthest relative to the said slide bar portion, said means being enlarged relative to said shaft but spaced sufficiently from said slide bar portion so that the aligned rings are readily slidable therebeneath.

11. An aligning device for use in aligning gaps in split rings which have their gap portions inherently in a substantially fixed spaced relation comprising, in combination, an elongated slide bar for slidable suspension support of a plurality of rings by their gap portions while disposed face to face, said slide bar having a vertical portion of small thickness in relation to the gaps in the rings projecting upwardly between the gap portions to guide the rings in their sliding movement and maintain the gaps aligned, and a rotary aligning shaft of small diameter in relation to the gaps in the rings supported above and close to the top of said vertical portion and having its axis substantially in the same vertical plane therewith, said aligning shaft being in acute angle relationship to that portion of said slide bar whereon said rings are slidable when aligned.

12. An aligning device for use in aligning gaps in split rings which have their gap portions inherently in a substantially fixed spaced relation comprising, in combination, an elongated slide bar for slidable suspension support of a plurality of rings by their gap portions while disposed face to face, said slide bar having a vertical portion of small thickness in relation to the gaps in the rings projecting upwardly between the gap portions to guide the rings in their sliding movement and maintain the gaps aligned, a rotary aligning shaft supported above and close to the top of said vertical portion and in the same vertical plane therewith, and power operable means for turning said shaft including a flexible shaft extending upwardly at an acute angle from one end of said aligning shaft, said flexible shaft being of a diameter small enough to pass readily through the gaps in the rings so as not to obstruct aligned rings in their sliding movement along the slide bar.

13. For use in aligning gaps in the inner circumference of rings which have their gap portions inherently in a substantially fixed spaced relation, a supporting rack for slidably supporting a stack of rings in face to face relation, said rack having a vertical guide portion of small thickness in relation to the gaps in the rings projecting into the gap portions to guide the rings in their sliding movement and maintain the gaps aligned, and gap aligning means above said guide portion adapted to enter the gaps in the inner circumference of said rings, so as to deposit rings with aligned gaps by gravity onto the rack.

ALBERT H. BATES.

REFERENCES CITED

The following references are of record in the file of this patent:

UNITED STATES PATENTS

| Number | Name | Date |
| --- | --- | --- |
| 1,990,579 | Adams et al. | Feb. 12, 1935 |